United States Patent [19]
O'Neill

[11] Patent Number: 6,033,110
[45] Date of Patent: Mar. 7, 2000

[54] BIMETAL COIL THERMOMETER MOVEMENT

[75] Inventor: Terrence John O'Neill, Lake Geneva, Wis.

[73] Assignee: Quartex, Inc., Lake Geneva, Wis.

[21] Appl. No.: 09/145,438

[22] Filed: Sep. 2, 1998

[51] Int. Cl.[7] ............................. G01K 15/00; G01K 5/62
[52] U.S. Cl. ................. 374/206; 374/1; 374/208
[58] Field of Search .................................. 374/206, 207, 374/208, 1, 204

[56] References Cited

U.S. PATENT DOCUMENTS

| 2,235,252 | 3/1941 | Bradley | 374/206 |
|---|---|---|---|
| 2,310,503 | 2/1943 | Widmer | 374/206 |
| 2,371,603 | 3/1945 | Bradley | 374/206 |
| 2,771,775 | 11/1956 | Argabrite | 374/208 |
| 3,952,596 | 4/1976 | Patel | 374/207 |
| 4,749,281 | 6/1988 | Nunes | 374/208 |
| 5,304,004 | 4/1994 | Nunes | 374/206 |
| 5,795,070 | 8/1998 | Geschwendes | 374/206 |

FOREIGN PATENT DOCUMENTS

| 0339397 | 12/1930 | United Kingdom | 374/206 |
|---|---|---|---|
| 0588218 | 5/1947 | United Kingdom | 374/206 |

*Primary Examiner*—Diego Gutierrez
*Assistant Examiner*—Gail Verbitsky
*Attorney, Agent, or Firm*—Laff, Whitesel & Saret, Ltd.

[57] ABSTRACT

A thermometer movement comprising a two-part shell and a bimetal coil housed within the two-part shell. The stationary end of the bimetal coil is attached to the rear part of the shell, which is rotatably mounted to the front part. The thermometer movement of the present invention can thus be calibrated by hand, without the need for a tool, merely by manually rotating the rear part of the shell relative to the front part.

11 Claims, 8 Drawing Sheets

BIMETAL COIL THERMOMETER MOVEMENT

FIELD OF INVENTION

This invention relates to a thermometer movement featuring a temperature responsive bimetal coil and, more particularly, a thermometer movement that can be manually calibrated without the use of a tool.

BACKGROUND OF THE INVENTION

The manufacture of a thermometer movement featuring a bimetal coil which coils or uncoils in response to changes in temperature is well-known in the art. In the construction of a typical bimetal coil thermometer movement, one end of the bimetal coil—the "stationary end"—is fastened to a stationary support and the other end of the coil—the "unrestrained end"—is directly or indirectly attached to an arrow, needle or other temperature indication device. When a change in temperature causes the bimetal coil to coil or uncoil, the unrestrained end moves. The movement of the unrestrained end of the bimetal coil is then translated to the indication device, thereby changing the position of the indication device relative to a graduated scale. The relative position of the indication device with respect to the graduated scale can then be used to determine the measured temperature.

It is also well-known in the art that the initial position of the indication device with respect to the graduated scale must be calibrated when the thermometer is manufactured or installed. In general, calibration is achieved by rotating the position of the stationary end of the coil, thereby causing the unrestrained end of the coil to move until the indication device points to the temperature on the graduated scale that corresponds to the ambient temperature at the time of manufacture or installation. Past attempts to devise a bimetal coil thermometer movement that can be easily and efficiently calibrated without the use of special tools have not been successful.

For instance, where the stationary end of the bimetal coil is the coil's inner end, past thermometers have mounted the inner end of the coil to a rotatable hub located within the thermometer shell. An opening is located in the rear of the shell so that the hub can be engaged by a suitable tool, such as a screwdriver or Allen wrench. In this manner, the thermometer is calibrated by using the tool to rotate the hub relative to the thermometer shell and thereby coil or uncoil the bimetal coil until the correct temperature reading is obtained.

Past thermometers in which the stationary end of the bimetal coil is its outer end have taken a similar approach. In some such thermometers, the unrestrained end is connected to an arbor rotatably mounted in an aperture in the front part of the thermometer shell. When the unrestrained end of the coil coils or uncoils as a result of a change in temperature, it rotates the arbor, which translates the movement of the unrestrained end to the indication device.

In some of the known thermometers of this type, the bimetal coil is placed in a rotatable drum sandwiched between the front and back parts of the thermometer shell and the outer end of the coil is affixed to the drum. An opening is located in the back part of the thermometer shell so that the drum can be engaged and rotated with a suitable tool, such as a screwdriver or Allen wrench. Rotation of the drum within the thermometer shell causes the bimetal coil to rotate relative to the thermometer shell. This rotation is translated to the indication device by means of the arbor. In this manner, calibration is achieved by using a tool inserted through the back of the thermometer shell to rotate the drum located therewithin until the indication device is aligned with the proper temperature reading.

Prior art thermometers as described above suffer from numerous drawbacks. The most obvious drawback is that the thermometer movement cannot be calibrated without the use of a suitable tool. The necessity of a tool not only makes calibration more difficult and time-consuming, it also makes calibration impossible if the proper tool is not on hand.

In addition, a person attempting to calibrate one of these prior art thermometers must operate a tool inserted through the back of the thermometer movement shell while, at the same time, monitoring the position of the indication device located on the front of the thermometer movement. This is an awkward task that requires a level of dexterity, which makes calibration difficult or impossible for many people.

Moreover, the need to visually observe the thermometer indication device during calibration in order to determine the amount of rotation required creates further difficulties, and can even make calibration impossible when the thermometer is bulky, heavy, affixed to a larger object (such as an incubator or cooler) or mounted to or through a wall to monitor the temperature on the other side of the wall (such as the temperature in a curing or drying room, a refrigerated room or a greenhouse).

OBJECTS OF THE INVENTION

It is therefore an object of the present invention to provide a thermometer movement that can be easily calibrated.

Another object of this invention is to provide a thermometer movement that can be manually calibrated without the use of a tool.

A further object of this invention is to provide a thermometer movement that can be calibrated without visually monitoring the indication device.

Other objects of this invention will become apparent from the description below.

BRIEF SUMMARY OF THE INVENTION

The invention described herein provides a thermometer movement comprising a two-part shell and a bimetal coil housed within the two-part shell. The stationary end of the bimetal coil is attached to the rear part of the shell, which is rotatably mounted to the front part. The thermometer movement of the present invention can thus be calibrated by hand, without the need for a tool, merely by manually rotating the rear part of the shell relative to the front part.

In a preferred embodiment, the invention further comprises positioning marks located on the outer edge of the rear part of the shell. These positioning marks correspond to the angular deflection of the bimetal coil and thus allow a user to calibrate the thermometer movement without visually observing the indication device during calibration.

DETAILED DESCRIPTION OF THE PREFERRED EMBODIMENTS

Figure 1:
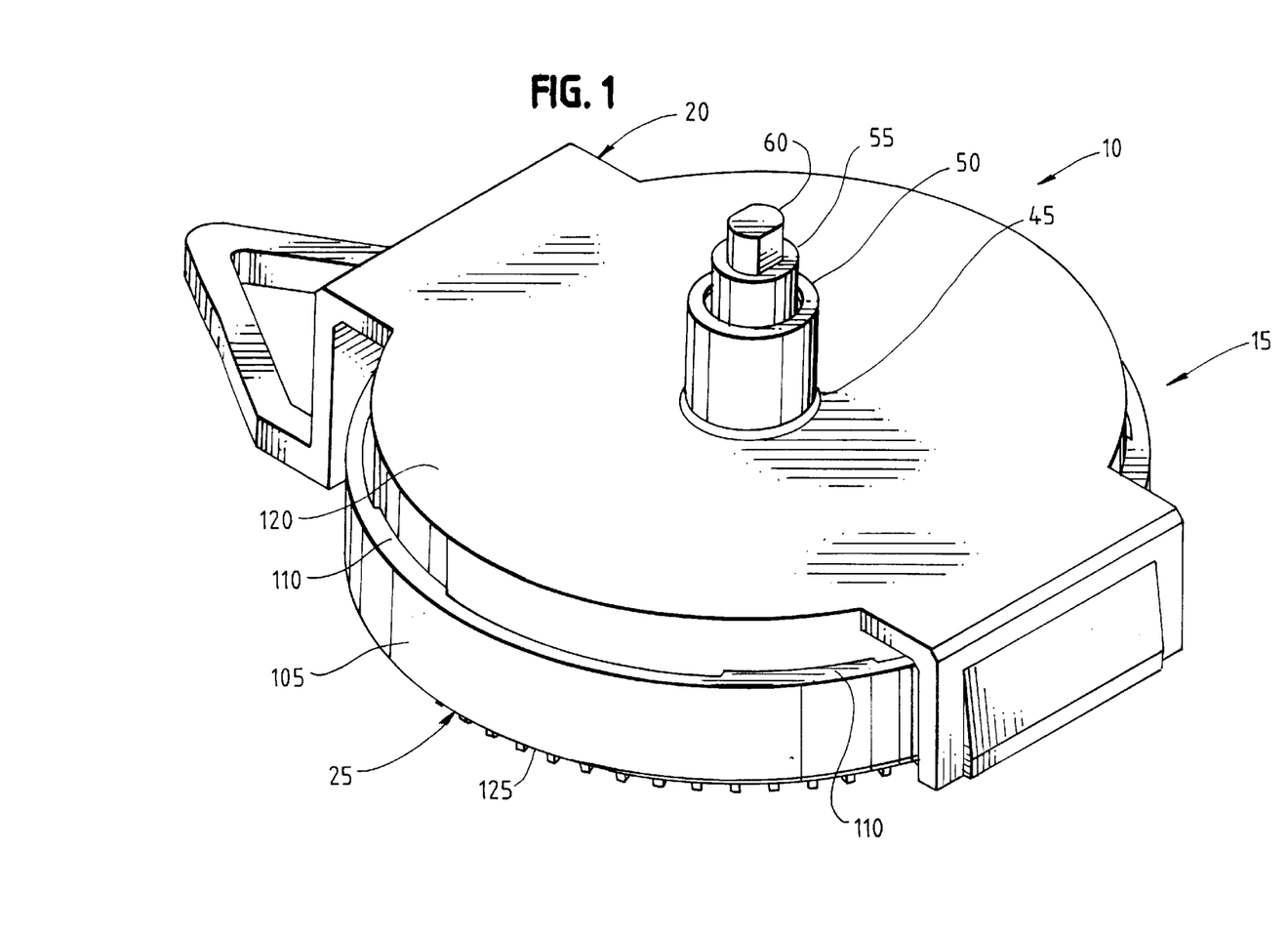
FIG. 1 is a front isometric view of a preferred embodiment of the invention.
Figure 2:
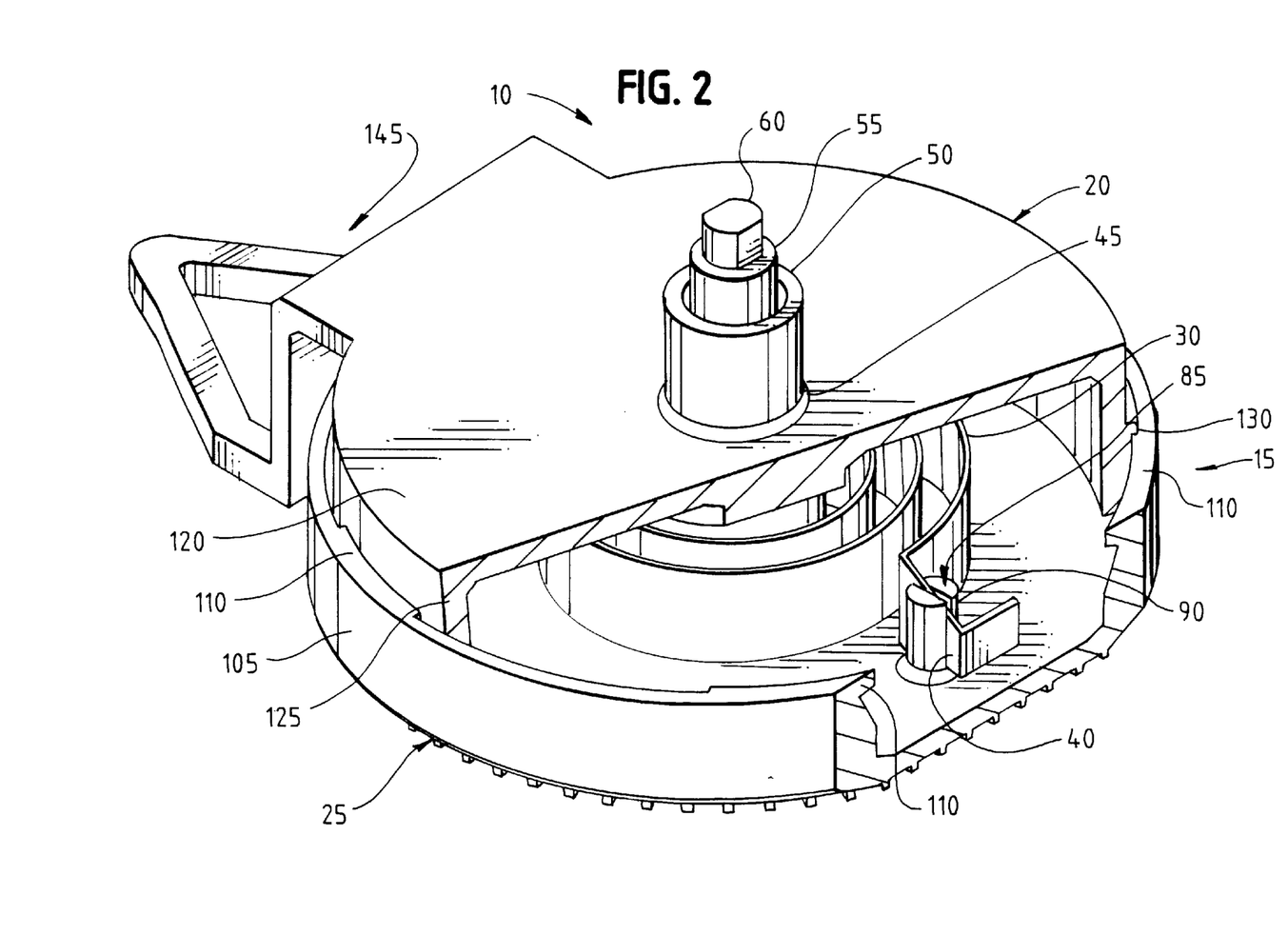
FIG. 2 is a front isometric cut-away view of the embodiment of the invention illustrated in FIG. 1.
Figures 5, 6, 7:
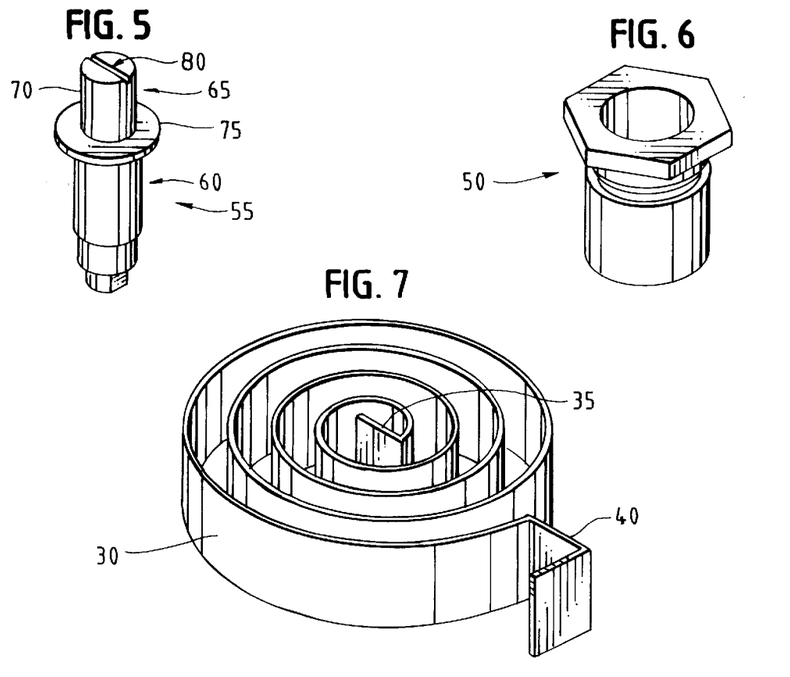
FIG. 5 is an isometric view of the arbor.
FIG. 6 is an isometric view of the dial bushing.
FIG. 7 is an isometric view of a bimetal coil.

FIGS. 1–4 and 8 illustrate a preferred embodiment of the inventive thermometer movement 10 comprising a two-part shell 15 having a front part 20 and a rear part 25. In a preferred embodiment, two-part shell 15 is made of either a plastic or metal. As best seen in FIGS. 2 and 7, bimetal coil 30 has an unrestrained end 35 and a stationary end 40 and is housed within shell 15.

Figure 9:
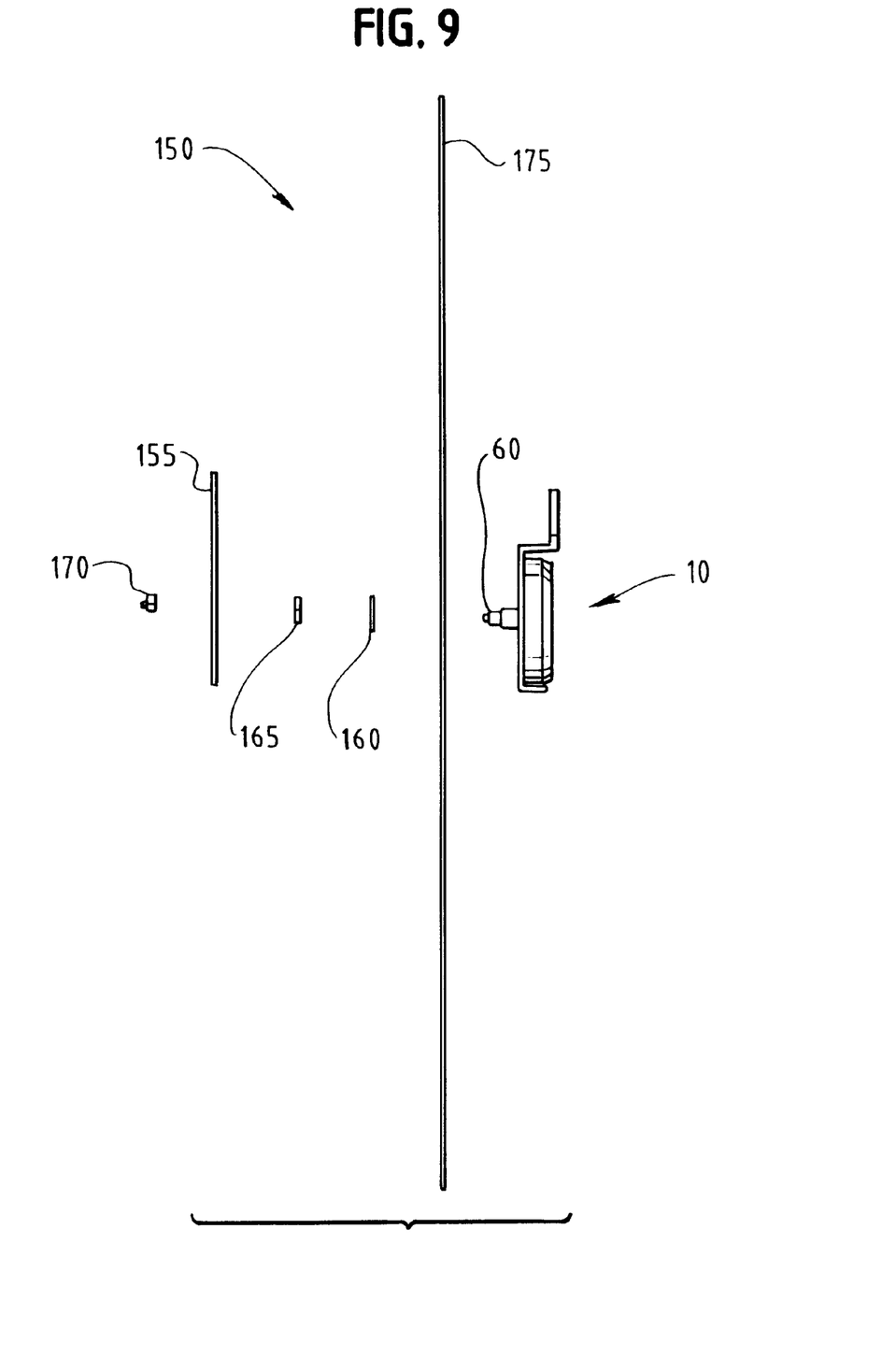
FIG. 9 is an exploded sideview of a thermometer featuring the embodiment of the invention illustrated in FIG. 1.
Figure 10:
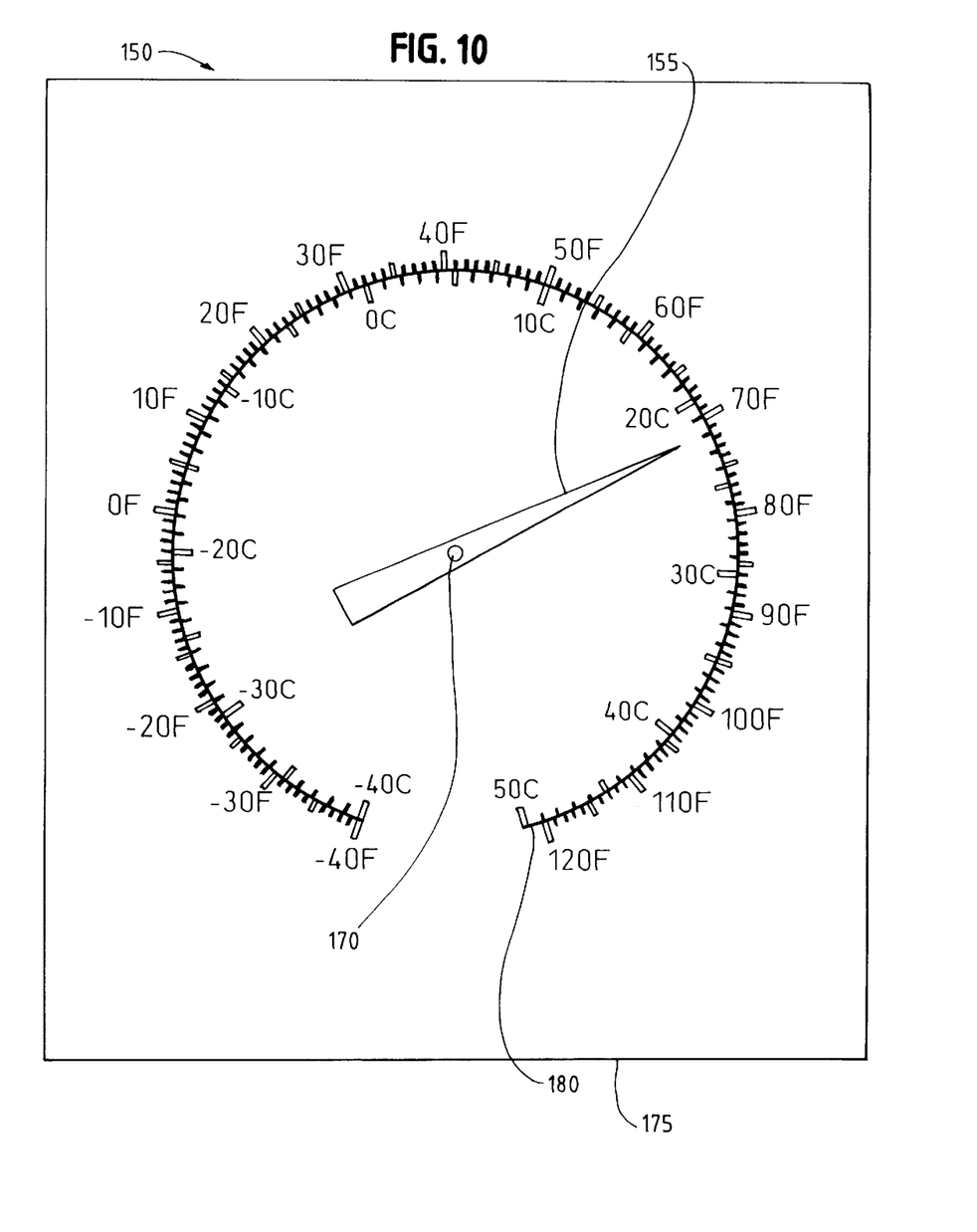
FIG. 10 is a front view of the thermometer of FIG. 9.

Aperture 45 is defined by front part 20 and is sized to receive bushing 50, which, in turn, is sized to rotatably receive arbor 55. Arbor 55 has a transmitting end 60 and a receiving end 65 and is rotatably mounted within bushing 50 so that receiving end 65 is within shell 15 and transmitting end 60 protrudes outwardly from front part 20. Transmitting end 60 of arbor 55 is adapted to be attached to any suitable indication device (not shown), such as a pointer or needle. FIGS. 9 and 10 illustrate a thermometer 150 in which transmitting end 60 of arbor 55 is attached to a pointer 155 by means of a washer 160, a nut 165 and a cap nut 170. As best seen in FIG. 9, thermometer movement 10 is situated behind thermometer dial board 175 and pointer 15 is situate on the face of dial board 175, with transmitting end 60 of arbor 55 extending through dial board 175 to engage pointer 155.

Receiving end 65 comprises post 70 extending from flange 75. The diameter of flange 75 is greater than the diameter of bushing 50, thereby preventing arbor 55 from sliding out of shell 15 via bushing 50. Post 70 is slotted longitudinally as at 80 to receive unrestrained end 35 of bimetal coil 30. Similarly, support 85 is mounted on the inner surface of rear part 25 and is slotted longitudinally as shown at 90 to receive stationary end 40 of bimetal coil 30. In the embodiment shown in FIGS. 2 and 4, the outer end of bimetal coil 30 is stationary end 40 and the inner end of bimetal coil 30 is the unrestrained end 35. Accordingly, in that embodiment and as shown in FIG. 2, it is preferred that support 85 is located near the circumference of rear part.

Figure 11:
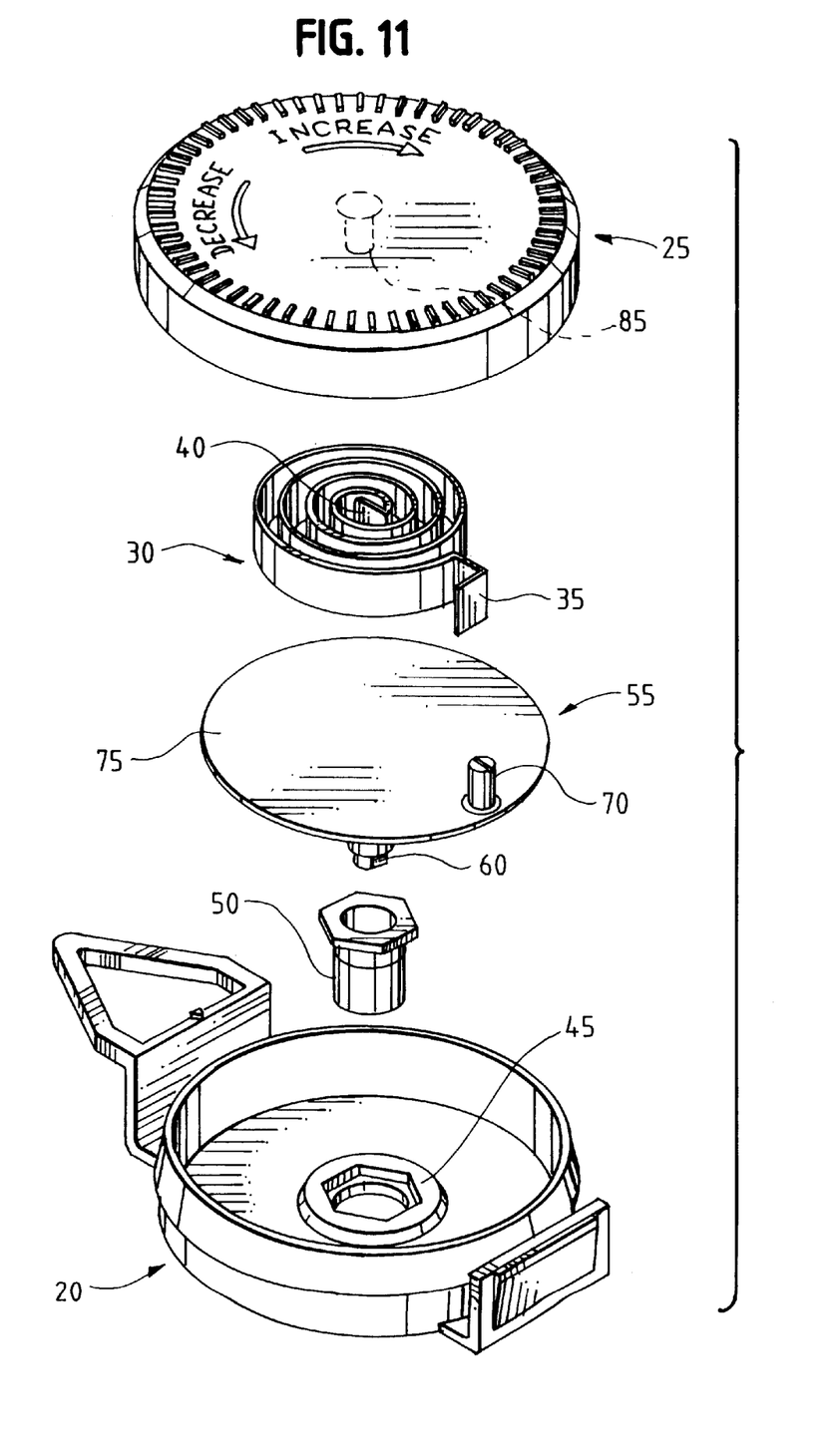
FIG. 11 is an exploded isometric view of another embodiment of the invention, with phantom lines showing the position of the support on the inner surface of the rear part.

But, as discussed above and shown in FIG. 11, the roles of the different ends of bimetal coil 30 can be reversed: the inner end of bimetal coil 30 can be stationary end 40 and the outer end of bimetal coil 30 can be unrestrained end 35. In this embodiment, it is preferred that support 85 is located near the center of the inner surface of rear part 25. In this embodiment, it is also preferred that post 70 of receiving end 65 is offset from transmitting end 60 as shown in FIG. 11 so aperture 45 can remain located in the approximate center of front part 20.

Thus, when a change in temperature causes bimetal coil 30 to coil or uncoil, unrestrained end 35 moves. The movement of unrestrained end 35 of bimetal coil 30 causes arbor 55 to rotate within bushing 50. The rotation of arbor 55 translates the movement of unrestrained end 35 to the indication device, thereby changing the position of pointer 155 relative to a graduated scale 180. As shown in FIG. 10, the relative position of the indication device with respect to the graduated scale can then be used to determine the measured temperature.

To allow for the easy calibration of the above-described thermometer movement, rear part 25 is rotatably mounted to front part 20. In the preferred embodiment, rear part 25 comprises a rear circular face 95 in FIG. 4 having a circumference defined by edge 100. Rear skirt 105 extends from edge 100 and a turned under lip 110 is located around the circumference of the inner surface 115 of rear skirt 105 in FIG. 8. Similarly, the preferred front part 20 comprises a front circular face 120 having a front skirt in FIG. 1 125. Raised rim 130 is located on the outer surface 135 of front skirt 125. A rim 130 is located along the circumference of front skirt 125. Lip 110 may be continuous, or, as shown in FIGS. 1 and 2, may be located at only selected points along front skirt 125.

Figure 8:
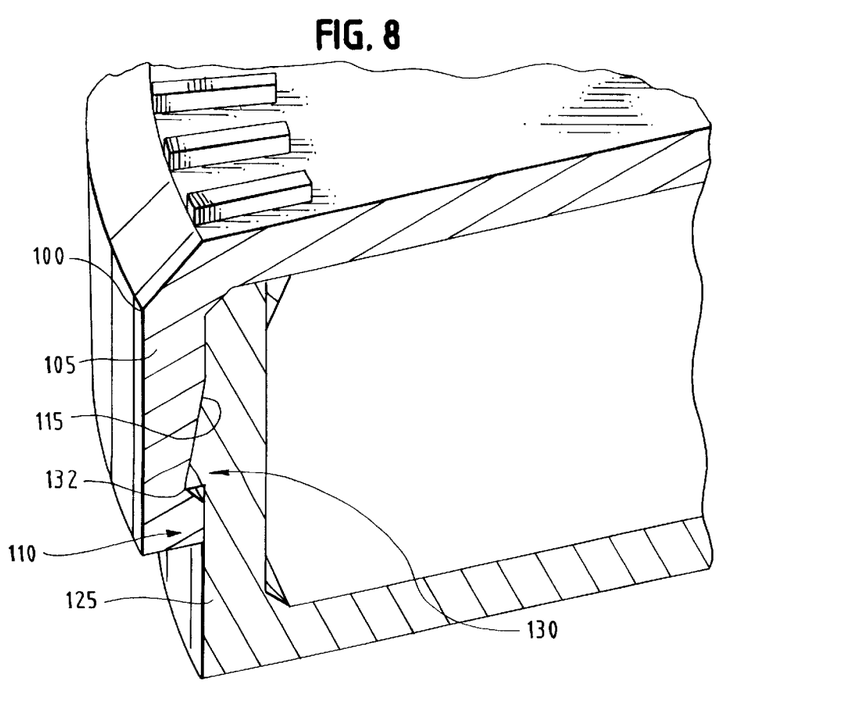
FIG. 8 is a sectioned view of the case cover attachment of the embodiment of the invention illustrated in FIG. 1.

Rear part 25 and front part 20 are sized so that front skirt 125 fits snugly within rear skirt 105 and lip 110 engages the edge 132 of rim 130 in FIG. 8. The fit between rear part 25 and front part 25 and, more particularly, lip 110 and rim 130 is snug enough so that it provides enough friction to prevent unintended movement of rear part 25, but loose enough so that rear part 25 can be manually rotated with respect to front part 20.

Figure 3:
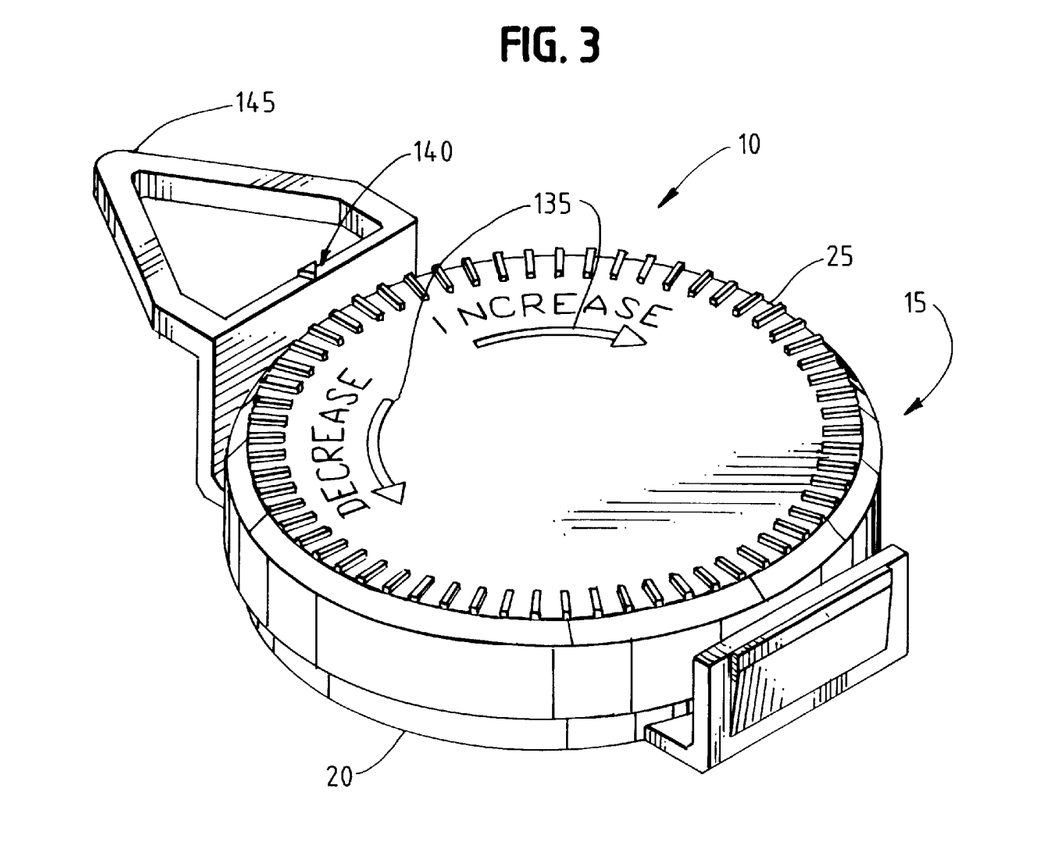
FIG. 3 is a rear isometric view of the embodiment of the invention illustrated in FIG. 1.
Figure 4:
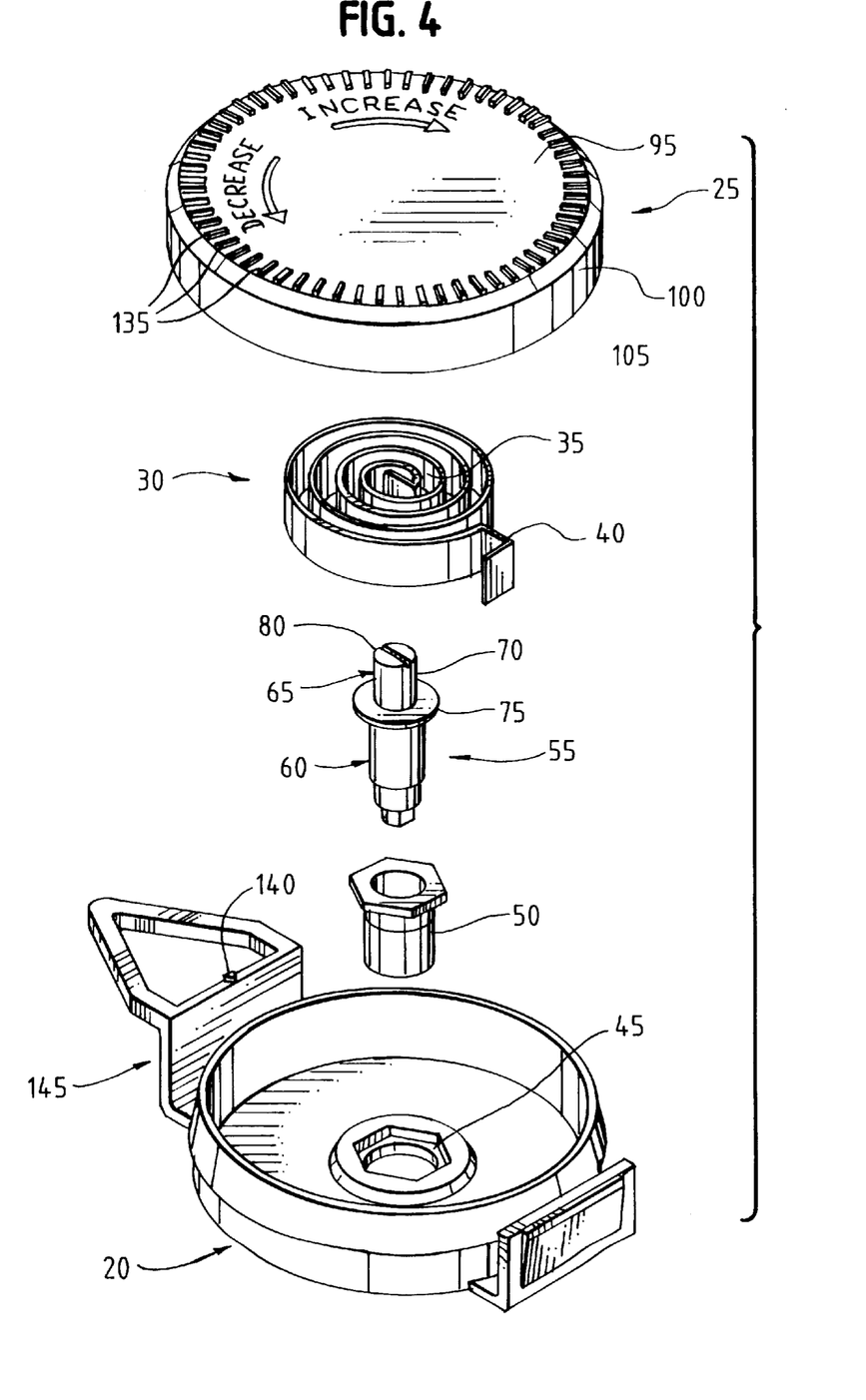
FIG. 4 is an exploded isometric view of the embodiment of the invention illustrated in FIG. 1.

In a preferred embodiment of the invention, positioning marks 135 as shown in FIG. 3 are located along edge 100 of rear part 25 and reference mark 140 is located on extension 145 of front part 20. Positioning marks 135 are located such that they measure the angular position of unrestrained end 35 in relation to stationary end 40, i.e., the extent to which bimetal coil 30 is coiled or uncoiled, and thus allow a user to calibrate the thermometer movement without visually observing the indication device during calibration.

For example, positioning marks 135 can be located so that the distance between each positioning mark represents enough rotation of bimetal coil 30 to move the associated indication device one degree in relation to a graduated scale associated with thermometer movement 10. If the user knows that the thermometer reading is two degrees higher than the actual temperature, he or she can calibrate the thermometer movement merely by manually rotating rear part 25 clockwise until the indicating mark that was originally aligned with reference mark 140 is now the second indicating mark to the right of reference mark 140.

Those skilled in the art will readily perceive how to modify the invention. Therefore, the appended claims are to be construed to cover all equivalent structures which fall within the true scope and spirit of the invention.

What is claimed is:

1. A thermometer movement comprising:

a shell having a front part and a rear part, the rear part having an inner surface and an outer surface and being rotatably mounted to the front part;

a coil support fixed to the inner surface of the rear part; and a bimetal coil having an unrestrained end that moves in response to a change in temperature and a stationary end attached to the coil support, at least a portion of the bimetal coil being positioned between the front part and the rear part of the shell, the thermometer movement being capable of being calibrated by manually rotating the rear part relative to the front part without the use of tools.

2. The thermometer movement of claim 1 further comprising an arbor having a receiving end and a transmitting end, the arbor being rotatably received within an aperture defined by the front part such that the receiving end is located within the shell and the transmitting end is located outside the shell, wherein the unrestrained end of the bimetal coil is attached to the receiving end of the arbor.

3. The thermometer movement of claim 2 wherein the transmitting end of the arbor is adapted to be attached to an indication device.

4. The thermometer movement of claim 1 wherein the bimetal coil has an inner end and an outer end, and the outer end is the stationary end of the bimetal coil.

5. The thermometer movement of claim 1 wherein the bimetal coil has an inner end and an outer end, and the inner end is the stationary end of the bimetal coil.

6. A thermometer movement comprising:

a shell having a front part and a rear part, the rear part having an inner surface and an outer surface and being rotatable mounted to the front part;

a coil support located on the inner surface of the rear part; and a bimetal coil having an unrestrained end that moves in response to a chance in temperature and a stationary end attached to the coil support, at least a portion of the bimetal coil being positioned between the front part and the rear part of the shell, wherein the unrestrained end of the bimetal coil has an angular position relative to the stationary end of the bimetal coil, the thermometer movement further comprising a plurality of indicating marks located on the outer surface of the rear part, the indicating marks being located so that their positions measure the angular position of the unrestrained end of the bimetal coil.

7. A thermometer movement comprising:

a shell having a front part and a rear part, the rear part having an inner surface and an outer surface and being rotatably mounted to the front part;

a coil support located on the inner surface of the rear part;

a bimetal coil having an unrestrained end that moves in response to a change in temperature and a stationary end attached to the coil support, at least a portion of the bimetal coil being positioned between the front part and the rear part of the shell, the unrestrained end of the bimetal coil having an angular position relative to the stationary end of the bimetal coil;

an arbor having a receiving end and a transmitting end, the arbor being rotatably received within an aperture defined by the front part such that the receiving end is located within the shell and the transmitting end is located outside the shell, wherein the unrestrained end of the bimetal coil is attached to the receiving end of the arbor and the transmitting end of the arbor is adapted to be attached to an indication device; and a plurality of indicating marks located on the outer surface of the rear part, the indicating marks being located so that their positions measure the angular position of the unrestrained end of the bimetal coil.

8. The thermometer movement of claim 7 wherein the bimetal coil has an inner end and an outer end, and the outer end is the stationary end of the bimetal coil.

9. The thermometer movement of claim 7 wherein the bimetal coil has an inner end and an outer end, and the inner end is the stationary end of the bimetal coil.

10. The thermometer movement of claim 7, wherein the front part includes a lip and the rear part includes a rim and the lip engages the rim.

11. The thermometer movement of claim 10, wherein the lip is located on a circular rear skirt extending from the rear part and the rim is located on a circular front skirt extending from the front part.

* * * * *